Figure 1:
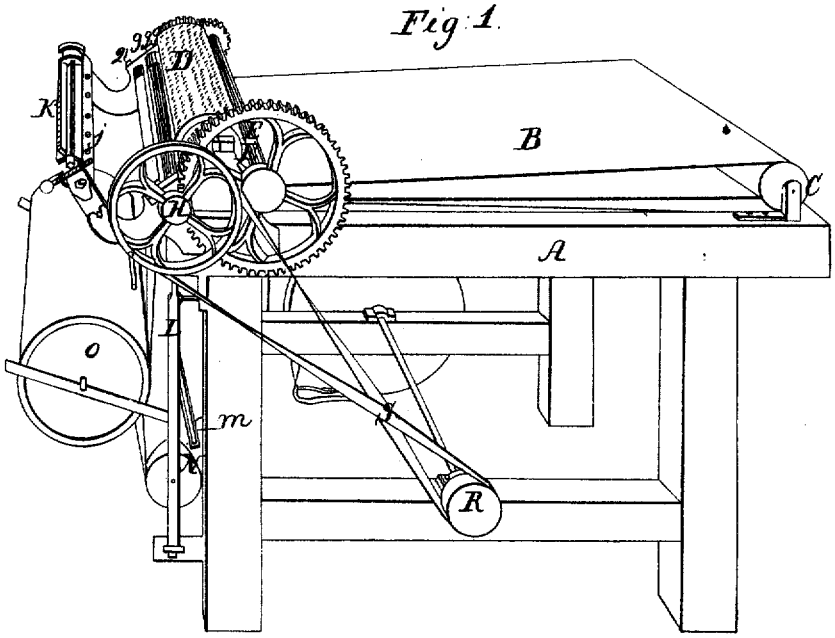

7501X

S. Couillard, Jr.

Wool Cleaner.

Patented Mar. 30, 1833.

N. PETERS, PHOTO-LITHOGRAPHER, WASHINGTON, D. C.

Samuel Couillard Jun: of Boston
State of Massachusetts.

Letters Patent.

The schedule referred to in these Letters Patent and making part of the same containing a description in the words of the said Samuel Couillard Jr. himself of his improvement in the machine for cleaning wool and detaching or separating burrs &c therefrom To all persons to whom these presents shall come Be it known that I Samuel Couillard Jun.r of the City of Boston in the county of Suffolk and commonwealth of Massachusetts, Mechanician have invented and applied to use a new and useful improvement in the art of cleaning animals wool or such like substances, and detaching and separating therefrom the burrs and other foreign materials connected and mixed with said wool or such like substance in the fleece or otherwise by extending & straightening the fibres of said wool or such like substance in such a manner as to bring the burrs and foreign materials wholly or principally unto the surface of said wool or such like substance there extending and straightening and then removing said burrs and foreign materials by scraping cutting, pinching, [illegible], or striking them off also the mechanical contrivances and arrangement with the application and mode of operating the same for the accomplishment of the purpose or purposes afore said not known before — And the principle of my said invention and the means whereby I accomplish the object aforesaid & the machinery used [illegible]

with the mode of operating the same, may be described
& set forth, in general terms as follows to wit;

First by causing the wool or such like substance
to pass or be drawn from a feeding cloth, suitable for the
same, thro and between two or more fluted ribbed or plain
rollers, properly fixed & arranged for the purpose in order
that said wool or such like substance may be presented
on the side aforesaid rollers so fixed & arranged oppo-
site to that where it enters between them, to a toothed
cylinder hereinafter described, in an uniform, regular, and
gradual manner & thus be better prepared for subsequent
operations Second by causing said wool or such like substance
to pass or be drawn over upon or against a revolving
ribbed or toothed cylinder or cylinders, roller or rollers,
band or bands between or against the same or any
such like cylinder or cylinders roller or rollers band or
bands, one or more armed with teeth or otherwise
properly fixed & arranged for the purpose so that said
wool or such like substance while in the process of
passing or being drawn as aforesaid is extended
elongated, or drawn into a much thinner sheet or
layer, and the fibers of said wool or such like
substances in a degree straightened and laid parallel
to each other while the burrs and foreign materials
commixed and mingled with the said wool or such
like substance are loosened and presented on the surface
or surfaces of said wool or such like substance, which
will be by this operation in a measure drawn, combed
and cleaned out from said burrs and other foreign mate-
rials, as well as from knots and snarls, Third, by causing said wool or such like sub-
stances to pass or be drawn from such cylinder or cylin roller, or rollers, band or bands, as above mentioned on-
to, thence between or against two or more drawing
rollers, ribbed, fluted, or plain properly connected with
a band belt or apron, & fixed and arranged for the
purpose, so that said wool or suchlike substance while
in the process of passing or being drawn as aforesaid
by the comparative velocity in the revolution of said
drawing rollers may receive a greater degree of elonga-
tion & be presented in a thinner sheet or layer and
the fibres of said wool or suchlike substance be still
more straightened, and laid more parallel with each
other —— At the same time the aforesaid sheet or
layer of said wool or such like substance shall
be during the process of passing or being drawn as
aforesaid thro' & between the said drawing rollers
so arranged as aforesaid, drawn, pinched or tightly
held around one or more of said drawing rollers,
and the ends of the fibres of the same confined in con-
sequence of the comparative shortness of the distance
between the nips, bites or pinches, of said drawing
rollers —— Thus the burrs and other foreign materials
connected and commingled with said wool or such
like substance, are loosened and presented on the surface
or surfaces of the same in such a manner as to be
easily detached & taken wholly off by scraping
cutting, pinching, clearing or striking or otherwise
operating on or against them while the wool or such
like substance thus tightly held is in the process of
passing or being drawn thro' among, over or upon the
said drawing roller or rollers & the belt or apron con-
nected, placed & arranged as aforesaid.

Fourth by reducing said wool or suchlike
substance while tightly held or pinched & in the process of passing or being drawn as above described to be
freed and cleared of burrs and other foreign materials
by the means of any scraper, percuter, picker, beater,
or blower, one or more which shall revolve against or other
-wise act upon or against said burrs or other foreign
materials so that said wool or such like substance
may pass or be drawn in a sheet or layer on to a re
-ceiving cylinder suitably fixed and arranged for the
purpose or be otherwise taken away in a disentangled
and cleared state & in a good condition for the subsequent
operations of the manufacturer And altho' I have herein declared that I
have applied my said invention to use yet this decla-
ration is not to be taken to mean public use, but merely
that use which is necessary for experiment and trial
without which my said invention could not have
been perfected and completed.

These may be considered to be the general
principles of my invention operative in the art of
cleaning animal wool & such like substance and
of detaching and separating therefrom burrs and other
foreign materials connected and mingled with the
same in the fleece or otherwise & of delivering said
wool and such like substances in a clean and highly
improved state ——— But the nature of my
said invention & the manner in which the purposes
aforesaid are accomplished with the mechanical con
-trivances used therefor, & the modes in which the
machinery or the parts thereof are arranged applied
& made to operate in order to clean and place the wool
or such like substance in the condition above mention[illegible]
may perhaps be better understood by reference to the
plan & drawing hereto annexed marked [illegible] & which

7501X

[illegible] are to be taken and considered as a part of this my specificati
A. in this plan represents a strong quadrangular frame made
(wood or any other suitable material) of sufficient length and width to
[illegible]ceive at the same time a whole fleece of wool of such consistency as ci
[illegible]umstances may require, B. Is a feeding cloth on which the wool or such
like substance to be operated upon is placed; it is made of canvass or
[illegible]ther suitable material for the purpose and passes around an end
[illegible]oller C. & around the lower of the two feeding rollers E.E.
E.E. Are two feeding rollers of about one inch and half diameter,
but may be varied in size according to the state of the wool or other
such substance — I make use of only two feeding rollers — but more
may be used if thought necessary. The uppermost of these two rollers
[illegible] ribbed or fluted, in order that burrs & foreign materials in the
wool may not be too much broken & flattened down by passing
between them & also with a view the better to retain and hold
back the wool, and convey it more gradually to the toothed cylinder D.
D. Is a cylinder about six inches diameter armed with teeth
which project from its surface from three to four eighths of an inch
These teeth are from one sixteenth to one eighth of an inch in diameter
pointed and bent something in the manner of the letter S. & set in
the cylinder about one fourth of an inch apart. But the form, size,
and position of the cylinder as well as of the teeth with which it
is armed may be varied according to the quality and condition
of the wool to be operated upon —— This cylinder is
placed on the side of the feeding rollers E.E. opposite to that
where the wool enters between them and so near them that the
teeth of the same may take the wool as near the pinch or bite of
the rollers E.E. as possible. g.g.g. 1.2, are drawing rollers
or a combination or a ~~combination~~ of drawing rollers (as seen in
fig 2.) connected with a band belt or apron [illegible]. extending the
whole length of them —— The rollers g.g.g. are of the same size or
nearly so one of which is fluted and more of them may be so, if deemed
expedient —— These three drawing rollers g.g.g. are fixed and

10601X revolve on their extremities as axes in their usual manner of
rolling — But the drawing rollers 1.2. are of a smaller size and
unconfined at their extremities except by the belt or apron I. By
this belt, or apron the rollers 1.2. are alone kept in their proper position
and made to revolve — while by the elasticity of the belt or apron
I. they are allowed to recede more or less so as to admit the passage
of burrs or other materials of greater or less size —

Figure 2:
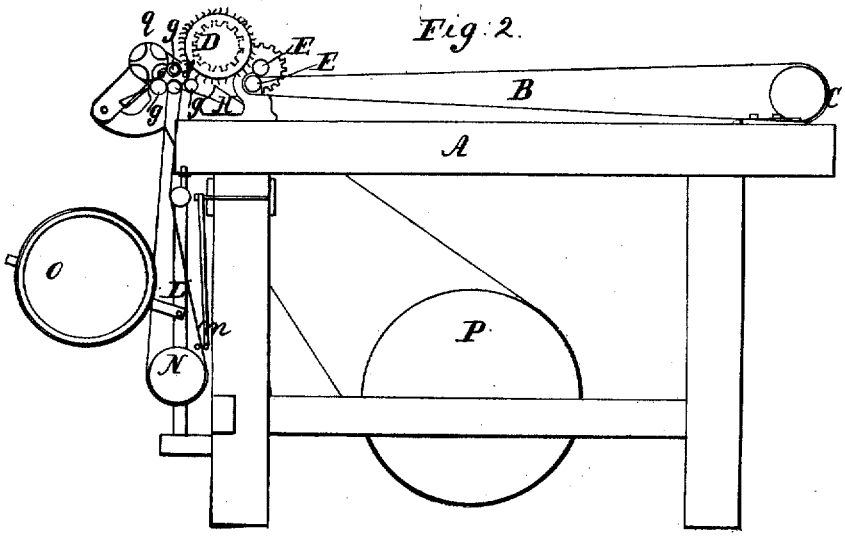

The drawing rollers g. g. g. as seen in fig 2. are about
one inch and a half in diameter & the small drawing rollers 1.2. about
one half inch in diameter & arranged as there represented, but the size
of the same may be varied as well as the arrangement & number in
some degree, and still effect the same purpose, H Is an intermediate shaft connected with suitable pinions
pulleys and gearings for driving the Machinery I. Is an endless belt or apron made of canvass or some other
suitable material, and passes around a large roller, e.f. and over
and among the combination of drawing rollers g.g.g. 1.2.

J. is called the preventer made of iron, steel or other material suita
-ble for the purpose — It is in the form of a thin plate or knife
& so placed that one edge of the same is parallel to the surface
of the outward small drawing roller 2. & in contact with the belt
or apron I, which passes over the roller 2 — The preventer is from one
to two inches in width extending the length of the rollers & from
one sixteenth to one eighth of an inch in thickness but may be
varied in its dimensions as may be convenient — One side of the
preventer J. in contact with the belt or apron I. is filed or worn
down to a blunt edge while the other edge or back is firmly fixed by
screws or otherwise to a strong piece of iron steel or other suitable
material which gives it firmness and stability —

This preventer J. may be placed stationary in the position
in which it is intended to operate or it may be so fixed that
it can be readily thrown back as seen in fig 1. —

K. is the beater or stripper it may be made of wood Iron or

7501X any material suitable for the purpose, It is a cylinder with projections
or wings the outward edges of which are filed or toothed transversely
with the axis of the cylinder and making alternately different angles
with the same, —— This beater or clipper is so placed that the
projections or wings as it revolves may come in contact with the
burrs and other foreign materials as near the blunt edge of the
piecener J. as possible — It may be made square or in other
forms or otherwise contrived to effect the same purpose,
L. L a piece of iron or other suitable substance, near the bottom
of which the belt or apron roller N. runs in its axis —
at the upper end of L there is a screw and nut suited for
shortening or lengthening the same (the lower end being movable
up and down,) and thus the belt or apron I. is loosened or strained.
M. represents the guides or regulator of the belt or apron, I.
N. is a large roller for the belt or apron I.
O. Is a large cylinder for the purpose of receiving the wool, or such
like substance from the belt or apron I, in a clean state in the form
of a sheet, thin layer or otherwise rolled around the same.
P is a pulley around which a band passes and connects it with
another pulley Q on the shaft of the beater or clipper K, which
it serves to drive Q is the pulley to the shaft of the beater or clipper
K, — R, is the pulley around which the band S. passes connecting
it with another pulley on the shaft H, which with suitable gearings
is the main driver of the machinery —

The foregoing is a description of the mechanical
contrivances and machinery which I make use of in my said in-
vention & for accomplishing the purposes herein before mentioned
all of which with the application and arrangement of the same may
be further illustrated and better understood by a brief account
of the mode of operation as follows to wit, The wool or such like substance in the fleece or otherwise
with the burrs & other foreign [illegible] connected and mingled
with the same is placed upon the feeding cloth, B, from thence it

7501X

[illegible] as it is drawn between the feeding rollers E.E. — a [illegible] manner & is then taken by the teeth of the toothed cylinder D, The toothed cylinder D, being much larger than the feeding rollers, E.E., it revolves so as to carry the points of the teeth with which it is armed with a velocity four or five times as great as that produced by the feeding rollers E.E., the consequence is that the wool or such like substance being retained or held back by the feeding rollers E.E., is drawn out into a sheet or layer four or five times as thin as that presented by the feeding rollers E.E, at the same time the fibres are straightened and arranged more parallel to each other, the burrs and other foreign materials, are loosened without being crushed and mixed up with the wool and in a considerable degree presented on the surface & the wool itself or other such like substance by this operation is in a degree combed and cleared out from such snarls & knots without having its fibres broken, ......

The next operation of the wool takes place on the side of the toothed cylinder D, opposite to that where the teeth of the same takes or draws the wool from the feeding rollers E.E. nearly on a level with them, Here the belt or apron F passing against and [illegible] the drawing rollers g.g.g. 1.2. receives the wool from the toothed cylinder D. and as the drawing rollers g.g.g. 1.2. are made to revolve with greater rapidity than the cylinder D, the consequence is that the wool is elongated into a still thinner sheet or layer and the fibres retained parallel to each other or rendered more so. — Besides by the arrangement of the drawing rollers g.g.g. 1.2. the two smaller ones 1 & 2 being left [illegible] at their extremities except by the belt or apron F, which allows them by its elasticity to revolve nearer or [illegible] nearer to the rollers [illegible] [illegible] g.g.g. [illegible] [illegible] by the [illegible] rollers g.g.g. [illegible] in consequence the burrs & other foreign matters by the thinning of the sheet or layer & the combing and [illegible] of the wool 7501x

[illegible] as aforesaid are brought wholly or principally on the surface in a loosened state so as to be taken off, while they are allowed by the elasticity of the belt or apron [illegible] to pass without being materially broken to the outward small drawing roller 2.

The wool or wool like substance being now drawn into a thin sheet or layer the fibres straightened and laid parallel to each other, and the wool tightly held around the outward drawing roller 2, with the burrs and foreign materials presented wholly or principally on the surface in a loosened state the next operation is to remove them from the wool, This is done by the preventer J. & the beater or clipper K, the blunt edge of the preventer j. pressing firmly on the wool tightly held on the small drawing roller, 2. raises the burrs & foreign materials as the wool is passing on under it while the beater K, revolving with great rapidity comes in contact with & operates upon the burrs & foreign materials, as they are raised by the preventer j. & thus takes them all over the blunt edge of the same. And the wool being now effectually cleaned and freed from burrs and foreign materials passes on to the cylinder O or may be taken off by hand or otherwise.

Notwithstanding I may have herein described parts of machinery and modes of operating which to some extent are for different purposes than those herein mentioned [illegible] and used before as well as machinery and modes of operating which are advantageous to my said invention; but which may be somewhat varied at the discretion of the operator or mechanic and which a skillful mechanic will readily understand. I hereby [illegible] [illegible] declare that what is hereby claimed by me as my invention in the art of cleaning animal wool or wool like substances is the detaching & separating therefrom the burrs and other foreign materials connected and mingled with said wool and such like substances in the fleece or otherwise by drawing and straightening the fibres of said wool or such like substances in such a manner as to 7501[illegible]

being the burrs and foreign matters wholly or principally on
the surface of said wool or such like substances, then extended
& straightened, and then removing said burrs & foreign materials
by scraping, cutting, pushing, blowing, or striking them off as herein
before described I also hereby claim the mechanical contrivances and arrange-
ment thereof, with the modes of applying and operating the same, for
the accomplishment of the purpose or purposes aforesaid as specified
in manner aforesaid — except as hereinafter mentioned, to wit the arrange-
ment and adaptation of the two small drawing rollers marked in
the plan and drawing hereto annexed marked A.) 1.2. in the
combination of drawing rollers g.g.g. 1.2. which are the device
& suggestion of Saml. Sawyer of said Boston Mechanician &
used in my said invention, by said Sawyer's consent in writing.

In testimony that the foregoing is a true speci-
fication of said invention in the art of cleaning animal
wool or such like substances & the mechanical contrivances &
management thereof with the modes of applying & operating
the same, as herein described I have hereunto set my hand
this 2nd day of March in the year of our Lord 1833.

Samuel Couillard

Witnesses
John Knapp
Evans Stewart

Dr in port folio

Cld.
[illegible]

(3516 words)